(12) United States Patent
Soyama et al.

(10) Patent No.: US 9,701,446 B2
(45) Date of Patent: Jul. 11, 2017

(54) CONTAINER WITH SYNTHETIC RESIN WINDOW, PREFORM, AND PREFORM INJECTION MOLDING APPARATUS

(71) Applicants: Hideaki Soyama, Tokyo (JP); Yusuke Ishii, Tokyo (JP)

(72) Inventors: Hideaki Soyama, Tokyo (JP); Yusuke Ishii, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 79 days.

(21) Appl. No.: 14/647,315

(22) PCT Filed: Nov. 30, 2013

(86) PCT No.: PCT/JP2013/082300
§ 371 (c)(1),
(2) Date: May 26, 2015

(87) PCT Pub. No.: WO2014/084392
PCT Pub. Date: Jun. 5, 2014

(65) Prior Publication Data
US 2015/0291319 A1     Oct. 15, 2015

(30) Foreign Application Priority Data
Nov. 30, 2012   (JP) ................... 2012-263132

(51) Int. Cl.
*B65D 25/54* (2006.01)
*B29C 49/08* (2006.01)
(Continued)

(52) U.S. Cl.
CPC .............. *B65D 25/54* (2013.01); *B29B 11/14* (2013.01); *B29C 45/1603* (2013.01);
(Continued)

(58) Field of Classification Search
CPC ........ B65D 25/54; B65D 1/0207; B65D 1/40; B29B 11/14; B29B 11/14053;
(Continued)

(56) References Cited

U.S. PATENT DOCUMENTS

| 4,890,994 A | 1/1990 | Shapler et al. |
| 6,270,868 B1 * | 8/2001 | Matsui ................... B29C 49/20 |
| | | 215/12.1 |

(Continued)

FOREIGN PATENT DOCUMENTS

| JP | S58-82232 U | 6/1983 |
| JP | S60-19410 U | 2/1985 |

(Continued)

OTHER PUBLICATIONS

Oct. 29, 2015 Office Action issued in Australian Patent Application No. 2013352983.

(Continued)

*Primary Examiner* — Robert J Hicks
*Assistant Examiner* — Kareen Thomas
(74) *Attorney, Agent, or Firm* — Oliff PLC

(57) ABSTRACT

A biaxially stretch blow molded container is formed with a clearly transparent window portion in a longitudinal strip shape by preventing mixture and cut-in of a colored resin to the window portion. In a predetermined range extending from an upstream end to a downstream position of a flow path including a cylindrical flow path and a reduced-diameter flow path formed in a nozzle portion, a pair of guiding ribs in the form of longitudinal ridges is linearly arranged partitioning the flow path in a circumferential direction, and a longitudinal groove flow path is formed between the guiding ribs. A molten B resin is supplied to the longitudinal groove flow path, and a molten A resin is supplied to the cylindrical flow path excluding the longitudinal groove flow (Continued)

path. The longitudinal strip-shaped flow path of the B resin interrupts the cylindrical flow path of the A resin in the circumferential direction.

4 Claims, 11 Drawing Sheets

(51) Int. Cl.
| | |
|---|---|
| *B65D 1/40* | (2006.01) |
| *B29C 45/16* | (2006.01) |
| *B65D 1/02* | (2006.01) |
| *B29B 11/14* | (2006.01) |
| *B29C 49/06* | (2006.01) |
| *B29B 11/08* | (2006.01) |
| *B29L 31/00* | (2006.01) |

(52) U.S. Cl.
CPC .......... *B29C 45/1684* (2013.01); *B29C 49/08* (2013.01); *B65D 1/0207* (2013.01); *B65D 1/40* (2013.01); *B29B 11/08* (2013.01); *B29B 2911/1402* (2013.01); *B29B 2911/1404* (2013.01); *B29B 2911/1408* (2013.01); *B29B 2911/1414* (2013.01); *B29B 2911/14026* (2013.01); *B29B 2911/14033* (2013.01); *B29B 2911/14053* (2013.01); *B29B 2911/14066* (2013.01); *B29B 2911/14093* (2013.01); *B29B 2911/14113* (2013.01); *B29C 49/06* (2013.01); *B29L 2031/712* (2013.01)

(58) Field of Classification Search
CPC ... B29B 2911/14066; B29B 2911/1408; B29B 2911/14093; B29B 2911/14113; B29B 2911/1414; B29B 11/08; B29B 2911/1402; B29B 11/14026; B29B 2911/14033; B29B 2911/1404; B29C 45/1684; B29C 45/1603; B29C 49/08; B29C 49/06; B29L 2031/712
USPC .... 220/662, 663, 665, 602, 703–719, 710.5, 220/656–658; 215/40, 42, 43, 385, 387, 215/12.1, 12.2, 13.1
See application file for complete search history.

(56) References Cited

U.S. PATENT DOCUMENTS

| | | | |
|---|---|---|---|
| 6,764,639 | B1 | 7/2004 | Richter |
| 6,988,629 | B2 | 1/2006 | Pedmo et al. |
| 8,579,133 | B2 * | 11/2013 | Marcus ............... A61J 9/08 |
| | | | 206/459.5 |
| 8,636,159 | B2 * | 1/2014 | Toyoda ............... B32B 1/02 |
| | | | 206/524.6 |
| 2005/0252879 | A1 | 11/2005 | Pedmo et al. |
| 2008/0241447 | A1 | 10/2008 | Shi |
| 2011/0108505 | A1 | 5/2011 | Toyoda et al. |
| 2012/0308689 | A1 * | 12/2012 | Poulat ............ B29C 49/0005 |
| | | | 426/106 |

FOREIGN PATENT DOCUMENTS

| | | |
|---|---|---|
| JP | H03-76624 A | 4/1991 |
| JP | 2004-330672 A | 11/2004 |
| JP | 2005-153901 A | 6/2005 |
| JP | 2010-012605 A | 1/2010 |
| TW | 200304869 A | 10/2003 |

OTHER PUBLICATIONS

Apr. 28, 2016 Office Action issued in Korean Patent Application No. 10-2015-7014198.
Apr. 5, 2016 Office Action issued in Japanese Patent Application No. 2012-263132.
Jun. 1, 2016 Search Report issued in European Patent Application No. 13859559.0.
Mar. 4, 2014 Written Opinion issued in International Patent Application No. PCT/JP2013/082300.
Mar. 4, 2014 International Search Report issued in International Patent Application No. PCT/JP2013/082300.
Jan. 19, 2016 Office Action issued in Chinese Patent Application No. 201380062669.7.
Jan. 25, 2017 Office Action issued in Canadian Patent Application No. 2,893,028.
Feb. 2, 2017 Office Action issued in Taiwanese Patent Application No. 102144054.
Apr. 5, 2017 Office Action issued in U.S. Appl. No. 15/383,531.

* cited by examiner

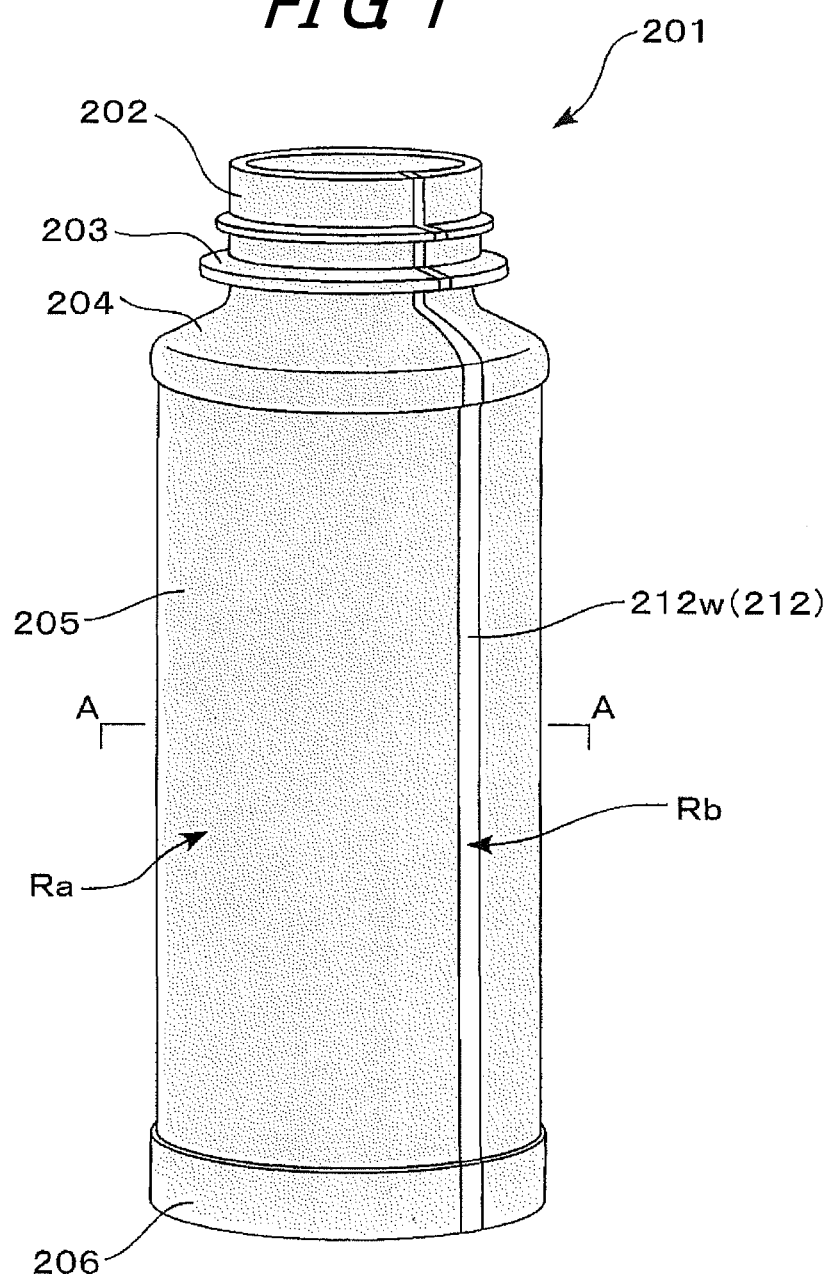

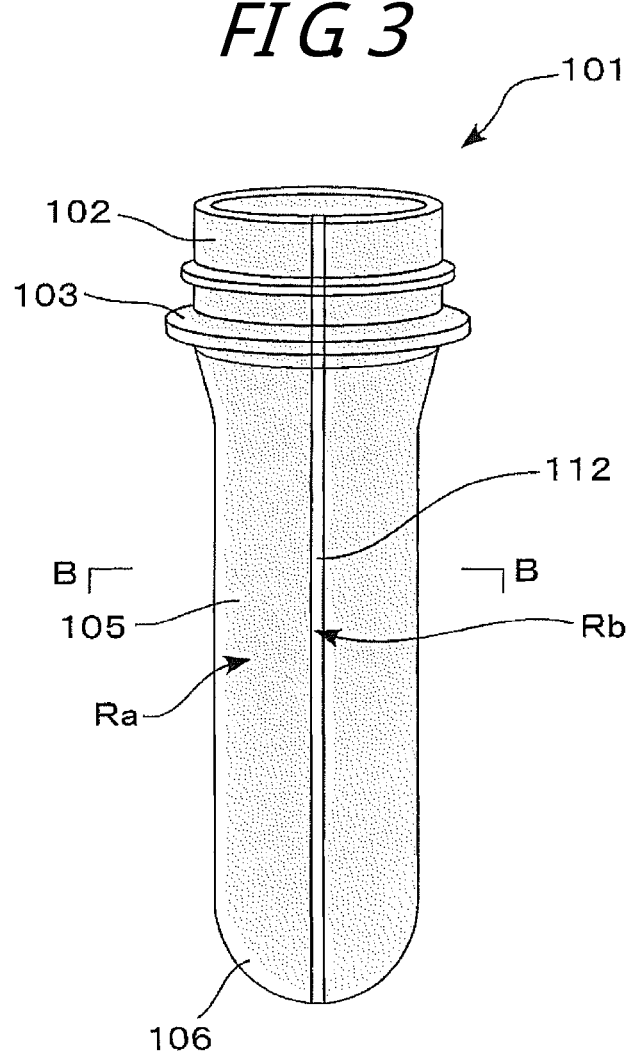

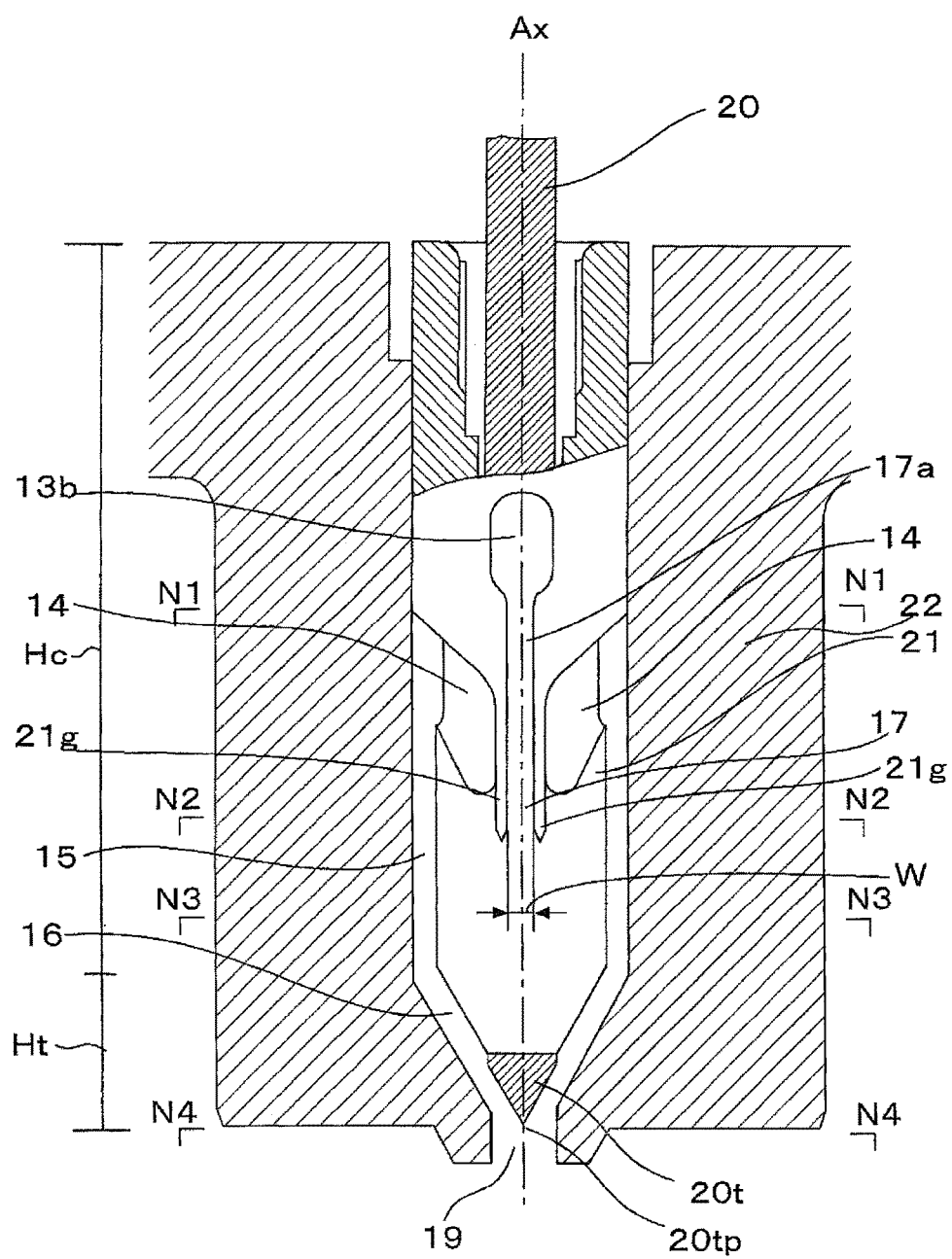

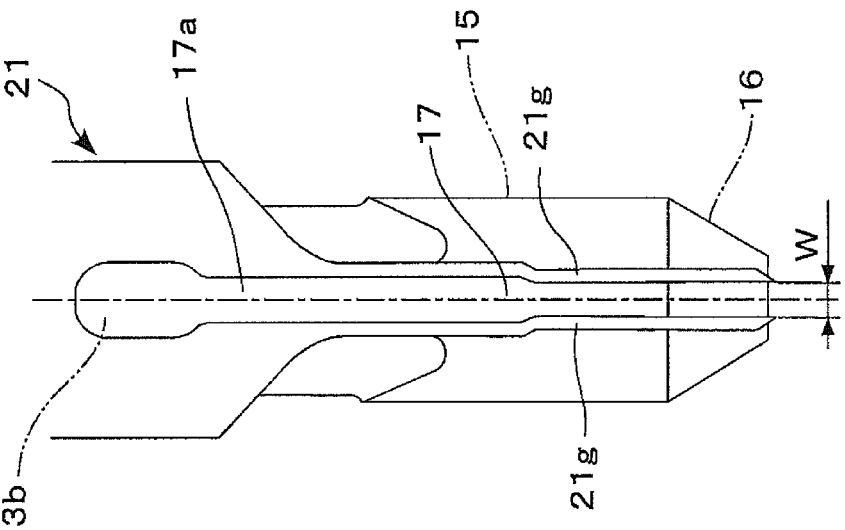
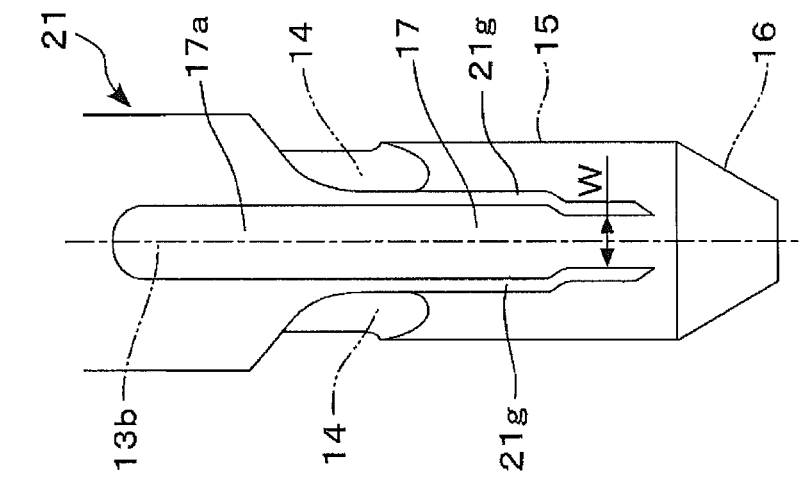
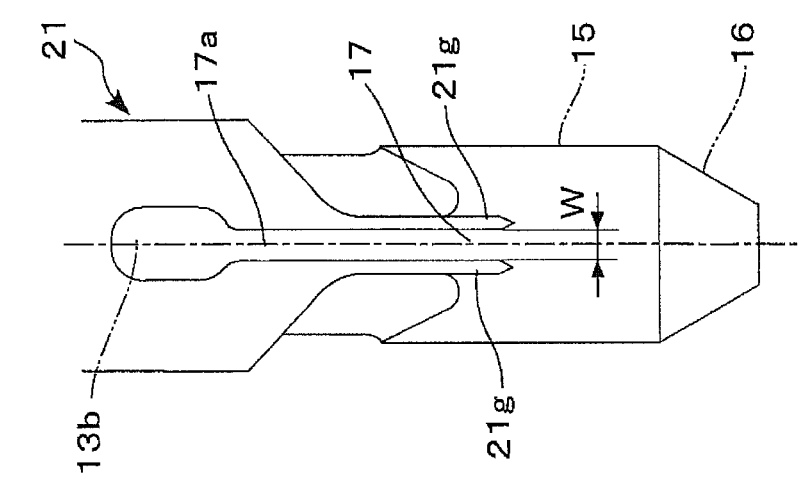

CONTAINER WITH SYNTHETIC RESIN WINDOW, PREFORM, AND PREFORM INJECTION MOLDING APPARATUS

TECHNICAL FIELD

This disclosure relates to a biaxially stretch blow molded synthetic resin container including a translucent or semi-translucent window portion through which an amount of a remaining content may be identified from an outside, a test-tube-shaped preform that is a precursor of the container, and an injection molding apparatus used for molding the preform.

BACKGROUND

Conventionally, blow molded containers made of synthetic resins are widely used in applications such as beverages, foods, detergents, cosmetics, and chemicals. Such a container often conceals the content for the purpose, for example, of protecting the content against ultraviolet rays and improving appearance and design quality.

Examples of ways of concealing the content from an outside view includes opaquing the container itself with a colored resin, opaquing an outer surface of the container by painting, and applying an overcoat of a shrink film, which is opaque or with opaque printing on a surface thereof, onto the outer surface of the container.

However, concealing the content from the outside view as such poses a problem that the amount of the remaining content may not be identified from the outside, and this leads to inconvenience and anxiety in use. Another problem arising when filling the content again for use is that too much content might be added to cause it to overspill due to invisibility of how much content is filled.

One possible way to overcome the aforementioned problems is to form a window portion, by masking a part of a container which is transparent or semi-transparent and painting the container and by peeling the masking after the painting. In a case of the shrink film, such a window portion may be formed by leaving a portion of the shrink film unprinted and transparent to allow the amount of the remaining content to be identified from the outside.

Furthermore, as described in Patent Literature 1, a blow molded container produced by blow molding an extrusion molded cylindrical parison, that is to say, by direct blow molding, may be relatively easily formed with a transparent window portion in a longitudinal strip shape after the blow molding, by coloring, during the extrusion molding of the parison, a majority of the parison to make the parison opaque while flowing an uncolored transparent resin into a portion of a cylindrical flow path formed in a dice used for the extrusion molding.

CITATION LIST

Patent Literature

PTL 1: JP2005153901A

SUMMARY

As described above, the container produced by the direct blow molding may be formed with a transparent window portion in the longitudinal strip shape relatively easily.

On the other hand, a biaxially stretch blow molded container made of polyethylene terephthalate (hereinafter, abbreviated as PET) that is formed by biaxially stretch blow molding an injection molded preform faces problems such as mixture of a colored resin into a portion of such a transparent window portion and deterioration in the transparency, even when a transparent window portion in the longitudinal strip shape is desired to be formed in the container.

This disclosure has been conceived to solve the aforementioned problems associated with the formation of a window portion in the biaxially stretch blow molded container by a nozzle structure of an injection molding apparatus. It could be helpful to provide a biaxially stretch blow molded container that is formed with a clearly transparent window portion in the longitudinal strip shape by effectively preventing the mixture of the colored resin.

This disclosure relates to the biaxially stretch blow molded synthetic resin container with a window, the test-tube-shaped preform which is the precursor of the container, and the injection molding apparatus used for molding the preform. For convenience of description, a description is given below of the injection molding apparatus, the preform, and the container with a window, in the stated order.

Firstly, one aspect of this disclosure resides in an injection molding apparatus that injection molds a test-tube-shaped preform that is subjected to biaxial stretch blow molding, the preform including a circumferential wall having a longitudinal strip-shaped portion that is made of a B resin and that is formed in a longitudinal strip shape penetrating the circumferential wall in a circumferentially predetermined position in the circumferential wall over a predetermined height range, a remaining portion of the circumferential wall excluding the longitudinal strip-shaped portion being made of an A resin.

The injection molding apparatus includes:
a nozzle portion that supplies the A resin and the B resin which are molten along a circumferential direction; and
a mold that is located in a front end of the nozzle portion.

The nozzle portion includes:
a cylindrical inner mandrel; an outer mandrel that is arranged coaxially with the inner mandrel; and a columnar shut-off pin that is inserted and arranged in the inner mandrel and that serves to release and shut off flows of the molten resins in a front end portion of the nozzle portion.

Between the inner mandrel and the outer mandrel, a cylindrical flow path and a reduced-diameter flow path are formed in the stated order in a direction toward a downstream side, the reduced-diameter flow path being configured by a cylindrical flow path tapered to have a reduced diameter toward downstream, and on downstream of the reduced-diameter flow path, a columnar joining flow path is formed in which the molten resins in cylindrical forms join into a columnar form, in a predetermined range extending from an upstream end to a predetermined downstream position of a flow path including the cylindrical flow path and the reduced-diameter flow path, a pair of guiding ribs in the form of longitudinal ridges is arranged in line to partition the flow path including the cylindrical flow path and the reduced-diameter flow path in the circumferential direction, and a longitudinal groove flow path is formed between the pair of guiding ribs, and the B resin is supplied to the longitudinal groove flow path, and the A resin is supplied to the cylindrical flow path excluding the longitudinal groove flow path, and a molten resin lump of the molten resins that have joined into the columnar form is injected and filled into a cavity of the mold via a pin gate located in a position of the cavity of the mold that corresponds to a middle of a bottom wall of a bottom portion of the preform.

According to the injection molding apparatus with the above structure, preferably, the structure of the nozzle portion, since in the predetermined range extending from the upstream end to the predetermined downstream position of the flow path including the cylindrical flow path and the reduced-diameter flow path, the pair of guiding ribs in the form of longitudinal ridges is arranged in line to partition the flow path in the circumferential direction, and the longitudinal groove flow path is formed between the pair of guiding ribs, the following advantageous effects are provided.

That is to say, segmentation between the A resin and the B resin, which flows in the longitudinal strip form, is clarified in the circumferential direction, and the mixture and cut-in of the A resin to the B resin, which flows in the longitudinal strip form, is effectively prevented. Thus, the injection molding apparatus is capable of molding the preform formed with a clear longitudinal strip-shaped portion formed in the longitudinal strip shape penetrating through the circumferential wall.

Furthermore, thus injection molded preform made of a transparent or a semi-transparent (hereinafter, collectively referred to as transparent) resin as the B resin and a resin obtained by coloring the B resin as the A resin may be subjected to biaxial stretch blow molding to produce the container formed with a transparent and clear longitudinal strip-shaped window portion.

Additionally, in the above structure, the A resin and the B resin are used for convenience of differentiation of the two resins. The A resin and the B resin may be differentiated in terms of the kinds of the synthetic resins or may be the same kind of two synthetic resins that are differentiated in terms of whether the synthetic resins are colored or uncolored.

Furthermore, even when the same kind of two synthetic resins are used for the A resin and the B resin, a molecular weight, molecular weight distribution, or the like of the A resin may be differentiated from that of the B resin as needed.

For example, to produce the container formed with the longitudinal strip-shaped transparent window portion, the same two synthetic resins, one for the A resin that is colored to make it opaque and the other one for the B resin that is left uncolored and transparent, may be used.

Furthermore, in the description of the above structure and in the description below, terms, e.g., the longitudinal groove flow path, implying directions such as the longitudinal and horizontal directions are used for convenience. Herein, the longitudinal direction corresponds to the central axis direction of the nozzle portion, and the horizontal direction corresponds to the direction that is perpendicular to the central axis direction.

The shape, such as the width, the groove depth, and the extent, of the longitudinal groove flow path may be determined as appropriate in consideration of the width of the longitudinal strip-shaped portion desired to be formed in the preform, and the degree of the mixture of the A resin and the B resin on the border between these resins, the extent of the cut-in of the A resin to the B resin, and the like when the longitudinal strip-shaped portion serves as the window portion. Furthermore, the width and the groove depth of the longitudinal flow path may be constant or varied. For example, the width may be reduced in the direction toward the downstream side, and the groove depth may be increased downstream.

Moreover, in the above structure, the extent of the longitudinal groove flow path is from the upstream end to the predetermined downstream position of the flow path including the cylindrical flow path and the reduced-diameter flow path, between the pair of guiding ribs arranged in line.

However, the extent of the longitudinal strip-shaped portion may be determined as appropriate in consideration of the configuration of the longitudinal strip-shaped portion, and the extent of the longitudinal strip-shaped portion may be, for example, to an upstream end portion of the cylindrical flow path, to around the border between the cylindrical flow path and the reduced-diameter flow path, or a downstream end of the reduced-diameter flow path.

The guiding ribs may be formed by leaving portions of the cylindrical flow path unprocessed during the cutting process of the cylindrical flow path and the reduced-diameter flow path.

Another aspect of this disclosure resides in the injection molding apparatus according to the above aspect, wherein on upstream of the cylindrical flow path, an outer circumferential surface of the inner mandrel is engraved with an upstream longitudinal groove flow path which is in communication with the longitudinal groove flow path.

With the above structure, the flow of the B resin in the longitudinal strip shape is firstly formed by the upstream longitudinal groove flow path and then joined with the A resin in the cylindrical flow path located downstream of the upstream longitudinal groove flow path via the longitudinal strip-shaped flow path. This allows more reliable formation of the longitudinal strip-shaped portion of the B resin.

Yet another aspect of this disclosure resides in the injection molding apparatus according to the above aspect.

In the injection molding apparatus, the shut-off pin includes a front end portion having a conical shape, and this conical front end portion is positioned to protrude from a lower end of the inner mandrel in a releasing position of the shut-off pin. Furthermore, a central axis of the conical front end portion is inclined to a front end thereof toward a direction that is opposite to a circumferential position in which the longitudinal groove flow path is formed, and a front end of the conical front end portion diverges to the direction that is opposite to the circumferential position in which the longitudinal groove flow path is formed to be eccentrically positioned.

In the above regard, a cylindrical parison that is extrusion molded as a precursor in the direct blow molding may be relatively easily imparted with a laminated structure including the A resin in a cylindrical form and the longitudinal strip-shaped B resin that completely interrupts the A resin in the radial direction. However, in the case of the injection molding of the test-tube-shaped parison, the cylindrically formed molten resins do not remain in the cylindrical forms but are joined into a columnar form in the joining flow path located in the front end of the nozzle portion, and the joined molten resins in the columnar form are injected and flowed to be filled into the test-tube-shaped cylindrical cavity via the pin gate. Therefore, the molten resin lump joined and formed in the columnar form in the front end portion of the nozzle portion includes the A resin in the columnar form and the B resin that is laminated, in the columnar A resin, in the form of a slit extending from a peripheral edge portion to a center position of the columnar A resin.

Accordingly, upon the joining, the A resin and the B resin collide with each other in the vicinity of a center position of the columnar flow path. At this collision time, the A resin might push the B resin to a peripheral direction and prevent the B resin from being laminated to the center position of the columnar flow path. In this situation, even when a transparent window portion in the longitudinal strip shape is desired to be formed in the circumferential wall of the container, various problems arise, such as the mixture of the colored A resin into a portion of the transparent window portion, for example, a portion of the transparent window portion that is located on an inner circumferential surface side, and the deterioration in the transparency of the portion of the window portion.

On the other hand, when the B resin is laminated in the form of a slit extending beyond the center position of the columnar flow path, even though the transparent B resin might mix into the inner circumferential surface side of the circumferential wall made of the colored A resin, the transparent B resin will be covered by the colored A resin from an outer side thereof, and therefore, appearance properties will not be deteriorated.

The structure of the conical front end portion according to the above aspect has been conceived based on a result of analysis of a phenomenon of how the B resin is laminated in the form of a slit in the A resin in such a columnar flow path.

With the above structure, the front end of the conical front end portion of the shut-off pin diverges to the direction that is opposite to the circumferential position in which the longitudinal groove flow path is formed to be eccentrically positioned. As a result, upon the joining, the B resin provides force to push the A resin toward the peripheral direction in the vicinity of the center position of the columnar flow path. Accordingly, the B resin is laminated in the form of a slit extending sufficiently to reach at least the center position, and even beyond the center position.

Thus, the longitudinal strip-shaped portion is formed in the preform in such a manner as to further ensure that the longitudinal strip-shaped portion penetrates the circumferential wall, and the container with a window including the transparent and clear longitudinal strip-shaped window portion of an even higher quality is achieved.

Secondly, a description is given of a structure of the preform according to this disclosure. The preform with a structure such as the following may be molded by the injection molding apparatus described above.

One aspect of this disclosure resides in an injection molded test-tube-shaped preform that is subjected to biaxial stretch blow molding.

The preform includes a circumferential wall including a longitudinal strip-shaped portion that is made of a transparent or a semi-transparent B resin and that is formed in a longitudinal strip shape penetrating the circumferential wall in a circumferentially predetermined position in the circumferential wall over a predetermined height range.

A remaining portion of the circumferential wall excluding the longitudinal strip-shaped portion is made of an A resin that is obtained by coloring a synthetic resin that is of a same kind as the B resin.

The aforementioned injection molding apparatus is capable of providing the preform in which the clear longitudinal strip-shaped portion, which is made of the transparent B resin, is formed to interrupt the circumferential wall, which is generally made of the colored A resin, in the circumferential direction, by effectively preventing the mixture and cut-in of the A resin to the longitudinal strip-shaped portion.

Additionally, the aforementioned injection molding apparatus may be configured to form the longitudinal strip-shaped portion over an entire height range of the preform. However, by, for example, shutting off and starting the supply of the B resin to the longitudinal groove flow path at appropriate timing, the longitudinal strip-shaped portion may also be formed over a predetermined height range of, for example, the trunk portion.

Another aspect of this disclosure resides in the preform according to the above aspect, further including a bottom portion, wherein the longitudinal strip-shaped portion is formed over an entire height range measured from a bottom wall of the bottom portion. Such a preform in which the clear longitudinal strip-shaped portion made of a transparent resin is formed over the entire height range would be difficult to achieve conventionally.

Yet another aspect of this disclosure resides in the preform according to the above aspect, wherein a portion of the B resin constituting the longitudinal strip-shaped portion flows around an opposite side to the circumferentially predetermined position in which the longitudinal strip-shaped portion is formed, to be laminated in the vicinity of a portion of the circumferential wall made of the A resin that is close to an inner circumferential surface of the circumferential wall. A preform with such a structure could not be achieved conventionally, and by the portion of the B resin flowing around the opposite side to the longitudinal strip-shaped portion, the clearly transparent longitudinal strip-shaped portion is formed to penetrate through the circumferential wall of the preform.

Meanwhile, even when the transparent B resin flows around close to the inner circumferential surface of the circumferential wall made of the colored A resin, the transparent B resin will be covered by the colored A resin from the outer side thereof, and appearance properties will not be deteriorated.

Yet another aspect of this disclosure resides in the preform according to the above aspect, wherein, in the bottom wall of the bottom portion, the longitudinal strip-shaped portion is arranged from a peripheral edge toward a center and beyond a center position of the bottom wall. A preform with such a structure could not be achieved conventionally.

Herein, as described above, the longitudinal strip-shaped portion is preferably arranged to extend beyond the center position of the bottom wall. However, the extent of the longitudinal strip-shaped portion may also reach at most the center position or the vicinity of the center position.

Thirdly, a description is given of the biaxially stretch blow molded synthetic resin container with a window according to this disclosure. The container formed with a structure such as the following may be molded by biaxially stretch blow molding the preform described above.

One aspect of this disclosure resides in a synthetic resin container with a window that is produced by biaxially stretch blow molding a test-tube-shaped preform. The synthetic resin container with a window includes a circumferential wall including a longitudinal strip-shaped portion that is made of a transparent or a semi-transparent B resin and that is formed in a longitudinal strip shape penetrating the circumferential wall in a circumferentially predetermined position in the circumferential wall over a predetermined height range. A remaining portion of the circumferential wall excluding the longitudinal strip-shaped portion is made of an A resin that is obtained by coloring a synthetic resin and that is adhesive to the B resin.

The longitudinal strip-shaped portion serves as a window portion.

The container with a window with the above structure may be produced by biaxially stretch blow molding the aforementioned preform in which the clear longitudinal strip-shaped portion, which is made of the transparent B resin, is formed by effectively preventing the mixture or cut-in of the opaque A resin to the longitudinal strip-shaped portion. Accordingly, the container with the clearly transparent window portion in the longitudinal strip shape is achieved.

Another aspect of this disclosure resides in the container with a window according to the above aspect, further including a bottom portion, wherein the longitudinal strip-shaped portion is formed over an entire height range measured from a bottom wall of the bottom portion. Such a biaxially stretch blow molded container with a window in which the clear longitudinal strip-shaped portion made of the transparent resin is formed over the entire height range would be difficult to achieve conventionally.

Of course, the longitudinal strip-shaped portion does not necessarily need to be formed over the entire height range as described above and may be formed over a predetermined height range determined in advance in accordance with the intended use.

Yet another aspect of this disclosure resides in the container with a window according to the above aspect, a portion of the B resin constituting the longitudinal strip-shaped portion flows around an opposite side to the circumferentially predetermined position in which the longitudinal strip-shaped portion is formed, to be laminated in the vicinity of a portion of the circumferential wall made of the A resin that is close to an inner circumferential surface of the circumferential wall.

A container with a window with such a structure could not be achieved conventionally, and by the portion of the B resin flowing around the opposite side to the longitudinal strip-shaped portion, the clearly transparent longitudinal strip-shaped portion is formed to penetrate through the circumferential wall of the preform.

Meanwhile, even when the transparent B resin flows around close to the inner circumferential surface of the circumferential wall made of the colored A resin, the transparent B resin will be covered by the colored A resin from the outer side thereof, and appearance properties will not be deteriorated.

Yet another aspect of this disclosure resides in the container with a window according to the above aspect, wherein, in the bottom wall of the bottom portion, the longitudinal strip-shaped portion is arranged from a peripheral edge toward a center and beyond a center position of the bottom wall. A biaxially stretch blow molded container with a window with such a structure could not be achieved conventionally.

With the above structures, the injection molding apparatus, the preform, and the container with a window according to this disclosure provide the following advantageous effects.

The injection molding apparatus is capable of forming in the nozzle portion the longitudinal groove flow path, in which the B resin flows, by the pair of guiding ribs partitioning the cylindrical flow path and the reduced-diameter flow path in the circumferential direction. As a result, the segmentation between the A resin, which flows in the cylindrical form, and the B resin, which flows in the longitudinal strip form, is clarified in the circumferential direction, and the mixture and cut-in of the A resin to the B resin, which flows in the longitudinal strip form, is effectively prevented. Thus, the injection molding apparatus is capable of molding the preform formed with a clear longitudinal strip-shaped portion formed in the longitudinal strip shape penetrating through the circumferential wall.

Furthermore, thus injection molded preform made of a transparent resin as the B resin and a resin obtained by coloring the B resin as the A resin may be subjected to biaxial stretch blow molding to produce the container formed with a transparent and clear longitudinal strip-shaped window portion.

Furthermore, the injection molding apparatus including the shut-off pin including the conical front end portion with the front end diverging to the direction that is opposite to the circumferential position in which the longitudinal groove flow path is formed to be eccentrically positioned provides the following effects. That is to say, upon the joining in the front end portion of the nozzle portion, the B resin provides force to push the A resin toward the peripheral direction in the vicinity of the center position of the columnar flow path. Accordingly, the B resin is laminated in the form of a slit extending sufficiently to reach at least the center position of the columnar flow path, and even beyond the center position. Thus, the longitudinal strip-shaped portion is formed in such a manner as to further ensure that the longitudinal strip-shaped portion penetrates the circumferential wall, and the container with a window including the transparent and clear longitudinal strip-shaped window portion of an even higher quality is achieved.

BRIEF DESCRIPTION OF THE DRAWINGS

In the accompanying drawings:

FIG. 1 is a perspective view illustrating a container with a window according to one embodiment;

FIG. 3 is a perspective view of a preform according to one embodiment;

FIG. 7 is an enlarged front view of a partial longitudinal section of a part of the vicinity of a nozzle portion of the injection molding apparatus illustrated in FIG. 5 taken along a line C2-C2 in FIG. 6;

FIGS. 10A to 10C are front views of three variations of an inner mandrel; and

Figure 2A:
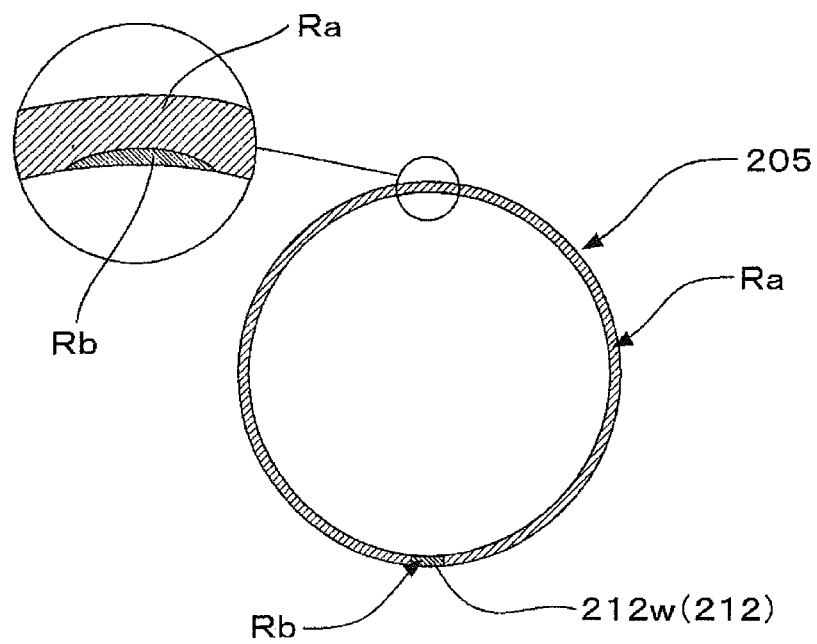
FIG. 2A is a sectional plan view taken along a line A-A in FIG. 1.

REFERENCE SIGNS LIST 1 mold
2 cavity
3 pin gate
11 nozzle portion
12a introduction path (of A resin)

12b introduction path (of B resin)
13a supply start position (of A resin)
13b supply start position (of B resin)
14 manifold
15 cylindrical flow path
16 reduced-diameter flow path
17 longitudinal groove flow path
17a upstream longitudinal groove flow path
19 joining flow path
20 shut-off pin
20t conical front end portion
20tp front end
21 inner mandrel
21g guiding rib
22 outer mandrel
101 preform
102 mouth tubular portion
103 neck ring
105 trunk portion
106 bottom portion
107 gate mark
112 longitudinal strip-shaped portion
201 container
202 mouth tubular portion
203 neck ring
204 shoulder portion
205 trunk portion
206 bottom portion
212 longitudinal strip-shaped portion
212w window portion
Ax central axis
Axc central axis (of conical front end portion)
center position
Hc cylindrical region
Ht tapered region
Ra A resin
Rb B resin
Sa resin supply unit (of A resin)
Sb resin supply unit (of B resin)
W flow path width

DETAILED DESCRIPTION

A biaxially stretch blow molded synthetic resin container with a window, a preform, and an injection molding apparatus according to embodiments will be described below with reference to the drawings.

Figure 2B:
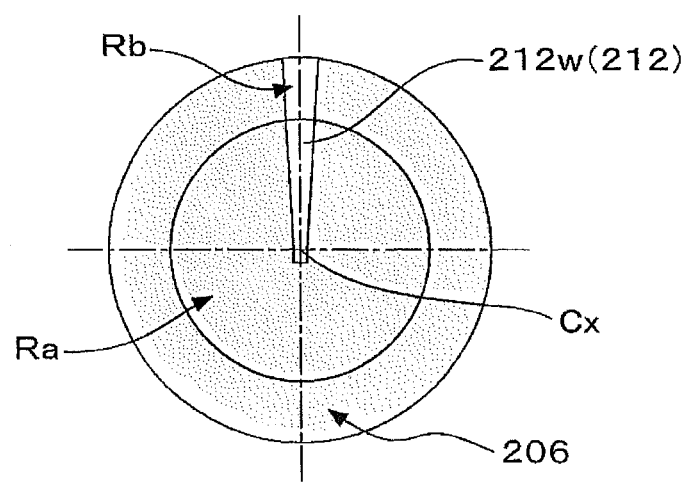
FIG. 2B is a bottom view of FIG. 1.

FIGS. 1 and 2 illustrate one embodiment of the container with a window. FIG. 1 is an overall perspective view of the container, FIG. 2A is a sectional plan view taken along a line A-A in FIG. 1, and FIG. 2B is a bottom view of FIG. 1.

A container 201 is made of a PET resin and has a bottle shape formed by biaxial stretch blow molding. The container 201 includes a mouth tubular portion 202, a shoulder portion 204 having a tapered tubular shape, a trunk portion 205 having a cylindrical shape, and a bottom portion 206. The mouth tubular portion 202 is provided on a circumference thereof with a neck ring 203. The trunk portion 205 has a diameter of 55 mm and an overall height of 190 mm.

The container 201 is formed with the A resin Ra, which is obtained by coloring a PET resin opaque white, and the B resin Rb, which is an uncolored PET resin. Substantially the entire container 201 is made of the opaque A resin Ra, and a longitudinal strip-shaped portion 212, which is made of the transparent B resin Rb, is located in a circumferentially predetermined position in a circumferential wall of the container 201 over the entire height range measured from un upper end of the mouth tubular portion 202 to a bottom wall of the bottom portion 206. The longitudinal strip-shaped portion 212 is utilized as a window portion 212w through which an inside of the container 201 is visible and through which the amount of a remaining content is identified.

In the sectional plan view as illustrated in FIG. 2A, substantially the entire circumferential wall is made of the A resin Ra, and the longitudinal strip-shaped portion 212 made of the B resin Ra is laminated along the circumferential direction in the form of a slit penetrating through the circumferential wall in such a manner as to interrupt the A resin Ra portion.

The longitudinal strip-shaped portion 212 has a horizontal width that varies according to respective stretch (draw) ratios of portions in the horizontal direction.

With reference to a bottom view in FIG. 2B, as illustrated in the figure, in the bottom wall of the bottom portion 206, the longitudinal strip-shaped portion 212 extends from a peripheral edge to a center position Cx, and further to a position beyond the center position Cx.

The longitudinal strip-shaped portion 212 also has a fan shape arising from an increased width from the center position to the peripheral edge as a result of the biaxial stretch blow molding.

FIG. 2A also includes an additional enlarged view of a part of the section of the circumferential wall. As illustrated in the enlarged view, a portion of the B resin Rb constituting the longitudinal strip-shaped portion 212 has flowed around the opposite side of the circumferentially predetermined position in which the longitudinal strip-shaped portion 212 is formed, to be laminated in the vicinity of a portion of the circumferential wall made of the A resin that is close to an inner circumferential surface of the circumferential wall.

With the portion of the B resin Rb flowing around the opposite side of the longitudinal strip-shaped portion 212, as described later with respect to our molding apparatus, the clearly transparent window portion 212w, which is obtained by the longitudinal strip-shaped portion 212, is formed to penetrate through the circumferential wall of the container.

Meanwhile, even when the transparent B resin flows around close to the inner circumferential surface of the circumferential wall made of the A resin as illustrated in the enlarged view of FIG. 2A, the transparent B resin will be covered by the colored A resin from the outer side thereof, and appearance properties will not be deteriorated.

Figure 4A:
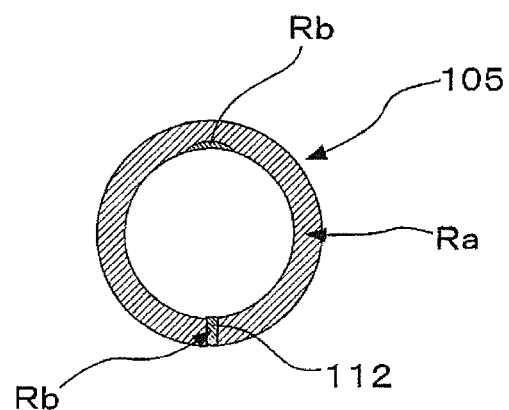
FIG. 4A is a sectional plan view of the preform taken along a line B-B in FIG. 3.
Figure 4B:
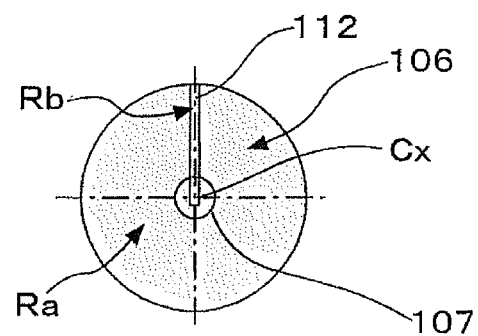
FIG. 4B is a bottom view of the preform illustrated in FIG. 3.

Next, FIGS. 3 and 4 illustrate a preform according to one embodiment. A preform 101 is a precursor of the container 201 according to the above embodiment. FIG. 3 is a perspective view, FIG. 4A is a sectional plan view taken along a line B-B in FIG. 3, and FIG. 4B is a bottom view of FIG. 3.

The preform 101 is made of a PET resin and has a test tubular shape formed by injection molding. The preform 101 includes a mouth tubular portion 102, a trunk portion 105 having a cylindrical shape, and a bottom portion 106. The mouth tubular portion 102 is provided on a circumference thereof with a neck ring 103.

The preform 101 is formed with the A resin Ra, which is obtained by coloring the PET resin opaque white, and the B resin Rb, which is the uncolored PET resin. Substantially the entire preform 101 is made of the opaque A resin Ra, and a longitudinal strip-shaped portion 112, which is made of the transparent B resin Rb, is formed in a circumferentially predetermined position in a circumferential wall of the preform 101 over the entire height range measured from un upper end of the mouth tubular portion 102 to a bottom wall of the bottom portion 106.

In the sectional plan view as illustrated in FIG. 4A, substantially the entire circumferential wall is made of the A resin Ra, and the longitudinal strip-shaped portion 112 made of the B resin Ra is laminated along the circumferential direction in the form of a slit completely penetrating the circumferential wall in such a manner as to interrupt the A resin Ra portion.

Furthermore, a portion of the B resin Rb constituting the longitudinal strip-shaped portion 112 flows around the opposite side of the circumferentially predetermined position in which the longitudinal strip-shaped portion 112 is formed, to be laminated in the vicinity of a portion of the circumferential wall made of the A resin that is close to an inner circumferential surface of the circumferential wall.

With reference to a bottom view in FIG. 4B, as illustrated in the figure, in the bottom wall of the bottom portion 106, the longitudinal strip-shaped portion 112 extends from a peripheral edge to the center position Cx, and further to a position beyond the center position Cx. There is also a gate mark 107 located in a middle of the bottom wall.

Next, FIGS. 5 to 8 illustrate the injection molding apparatus according to one embodiment. The injection molding apparatus is used for injection molding the preform 101 according to the above embodiment.

Figure 5A:
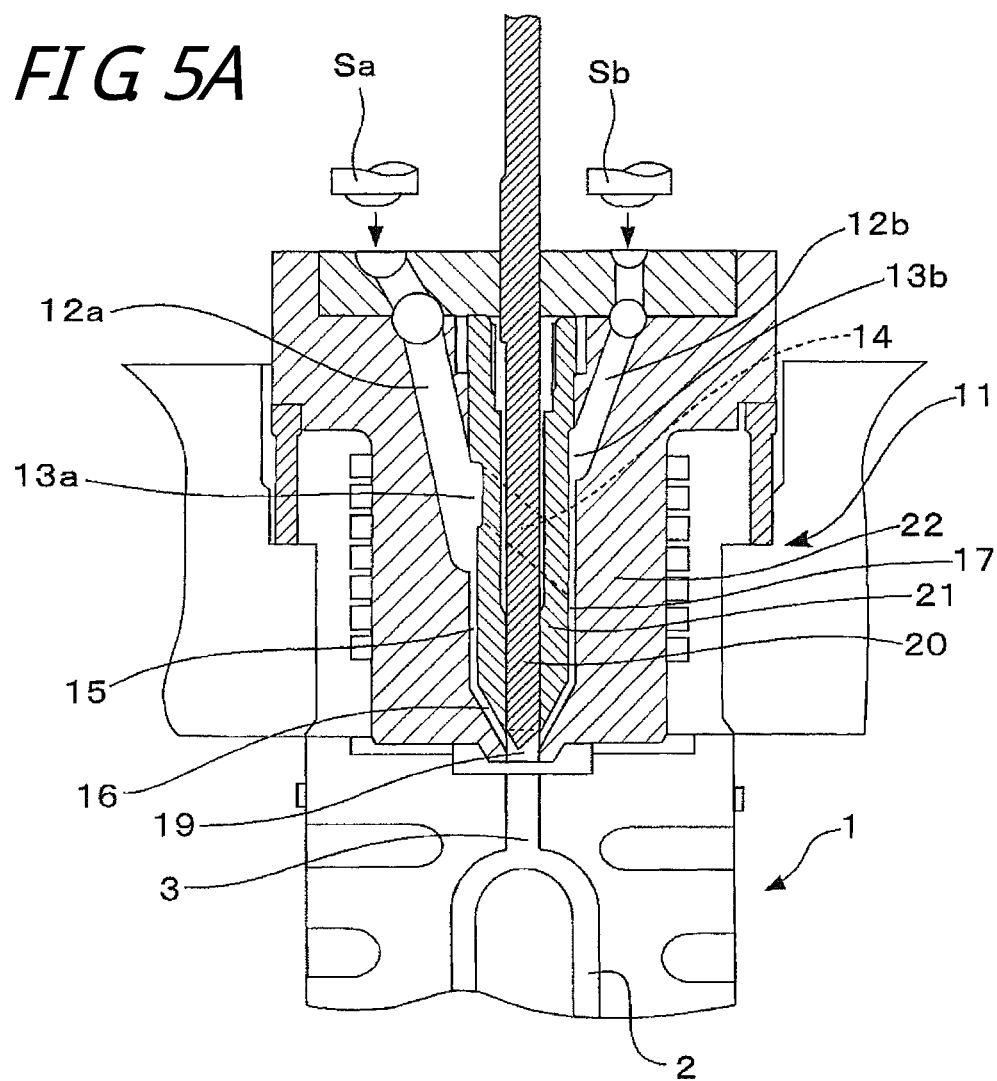
FIG. 5A is a side view illustrating a longitudinal section of a part of an injection molding apparatus according to one embodiment taken along a line C-C in FIG. 6.
Figure 5B:
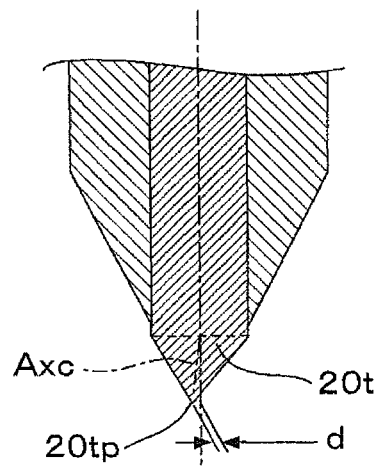
FIG. 5B is an enlarged view of a front end portion of a shut-off pin illustrated in FIG. 5A.
Figure 6:
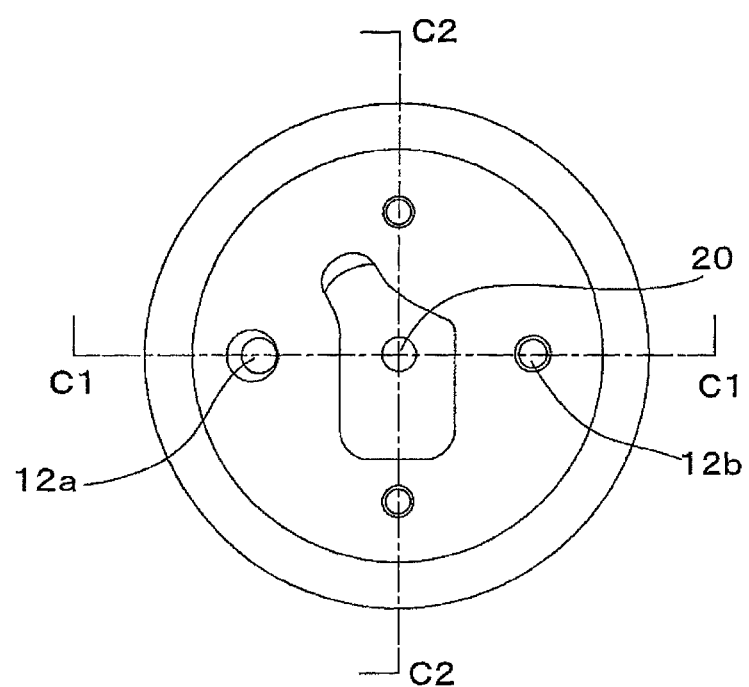
FIG. 6 is a plan view of the injection molding apparatus illustrated in FIG. 5.

FIG. 5A is a side view illustrating a longitudinal section taken along a line C1-C1 in FIG. 6, and FIG. 5B is an enlarged view of a front end portion of a shut-off pin 20 illustrated in FIG. 5A, FIG. 6 is a plan view, and FIG. 7 is an enlarged front view of a partial longitudinal section of a part of the vicinity of a nozzle portion 11 taken along a line C2-C2 in FIG. 6.

FIGS. 8A to 8E illustrate plane sectional shapes of flow paths in the nozzle portion 11.

The injection molding apparatus includes resin supply units Sa and Sb that supply the A resin Ra and the B resin Rb in their molten states, a nozzle portion 11 that laminates these resins in the circumferential direction, and a mold 1 that shapes the preform (refer to FIG. 5A).

A basic structure of the nozzle portion 11 includes the cylindrical inner mandrel 21 and an outer mandrel 22 that are coaxially arranged, and a columnar shut-off pin 20 that is inserted and arranged in the inner mandrel 21 in a manner such that the shut-off pin 20 may slidably move forward and backward. The shut-off pin 20 serves to release and shut off flows of the molten resins in a front end portion of the nozzle portion 11.

With reference to the enlarged view of the vicinity of the front end portion of the shut-off pin 20 in FIG. 5B, as illustrated in the enlarged view, the front end portion of the shut-off pin 20 has a conical shape, and this conical front end portion 20t is positioned to protrude from a front end of the inner mandrel 21 in a releasing position of the shut-off pin 20.

In the present embodiment, a central axis Axc of the conical front end portion 20t is inclined to a front end thereof toward a (left) direction that is opposite to a circumferential position (on the right in FIG. 5) in which a longitudinal groove flow path 17 is formed, and a front end 20tp of the conical front end portion 20t diverges to the direction that is opposite to the circumferential position in which the longitudinal groove flow path 17 is formed to be eccentrically positioned.

In the present embodiment, the front end 20tp of the conical front end portion 20t has an eccentricity of 0.4 mm.

As illustrated in FIG. 7, the inner mandrel 21 and the outer mandrel 22 each include a cylindrical region He and a tapered region Ht.

Between the inner mandrel 21 and the outer mandrel 22, a cylindrical flow path 15 is formed in the cylindrical region He, and a reduced-diameter flow path 16 in communication with the cylindrical flow path 15 is formed in the tapered region. The reduced-diameter flow path 16 is configured by a cylindrical flow path tapered to have a reduced diameter toward downstream. Furthermore, on the downstream of a front end of the reduced-diameter flow path 16, there is formed a columnar joining flow path 19 in which the molten resins in cylindrical forms join into a columnar form.

The cylindrical flow path 15 is formed by cutting an outer circumferential surface of the inner mandrel 21 in a lower half region of the inner mandrel 21.

During the cutting process of the cylindrical flow path 15, upper end portions of the cylindrical flow path 15 are left unprocessed to form a pair of guiding ribs 21g in the form of longitudinal ridges.

Figure 8A:
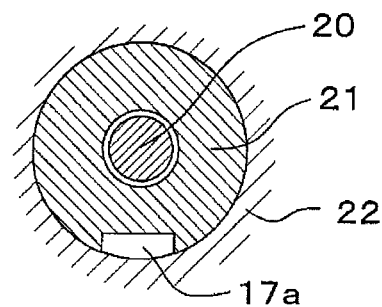
FIG. 8A is a sectional plan view flows in the longitudinal strip taken along a line N1-N1 in FIG. 7.
Figure 8B:
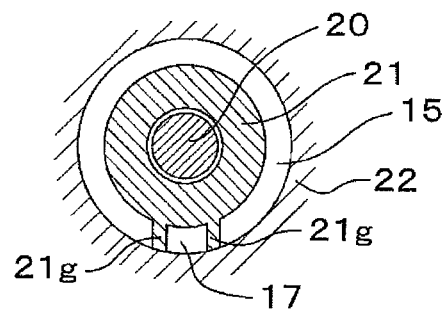
FIG. 8B is a sectional plan view taken along a line N2-N2 in FIG. 7.

As illustrated in FIG. 8B, the pair of guiding ribs 21g in the form of longitudinal ridges partitions the cylindrical flow path 15 in the circumferential direction, and the longitudinal groove flow path 17, in which the B resin Rb flows, is formed between the pair of guiding ribs 21g.

Furthermore, on the upstream of the cylindrical flow path 15, the outer circumferential surface of the inner mandrel 21 is engraved with an upstream longitudinal groove flow path 17a (refer to FIG. 8A) which is in communication with the aforementioned longitudinal groove flow path 17.

Herein, the upstream longitudinal groove flow path 17a and the longitudinal groove flow path 17 each include a flow path width of 2 mm and a groove depth of 1 mm.

The cylindrical flow path 15, in which the A resin Ra flows, also has a groove depth of 1 mm.

In the following, a description is given of molding processes of the preform 101 illustrated in FIGS. 3 and 4 using the injection molding apparatus (refer to FIGS. 5 to 8).

Firstly, the A resin Ra, which is obtained by coloring the PET resin white, is supplied from the resin supply unit Sa to an A resin introduction path 12a and caused to flow into the cylindrical flow path 15 via a supply start position 13a and the manifold 14.

On the other hand, the B resin Rb, which is the uncolored PET resin, is supplied from the resin supply unit Sb to a B resin introduction path 12b and caused to flow to the upstream longitudinal groove flow path 17a and the longitudinal groove flow path 17 via a supply start position 13b (refer to FIGS. 5 and 7).

The supply start position 13b of the B resin Rb is located further upstream of the supply start position 13a of the A resin.

As the resin supply units Sa and Sb, various devices, such as a screw extruder or an accumulator including a plunger attached to a front end of an extruder, may be used.

Then, the molten A resin Ra is shaped into a cylindrical form by the cylindrical flow path 15, and in the upper end portion of the cylindrical flow path 15, the molten B resin Rb flows across the longitudinal groove flow path 17 to interrupt the A resin Ra in the circumferential direction. However, the longitudinal groove flow path 17 is formed between the pair of guiding ribs 21g and 21g (refer to FIG. 8B), and therefore, the A resin is prevented from mixing with or cutting into the B resin.

In a region extending from a lower half region of the cylindrical flow path 15 to the reduced-diameter flow path 16, the guiding ribs 21g and 21g are not arranged any more, that is to say, the longitudinal groove flow path 17 is not formed any more. Accordingly, the B resin Rb is in direct contact with the A resin Ra to interrupt the flow of the A resin Ra in the cylindrical form.

Thus, the longitudinal groove flow path 17 does not need to be formed in the overall ranges of the cylindrical flow path 15 and the reduced-diameter flow path 16. As in the present embodiment, by simply forming the longitudinal groove flow path 17 in the upper end portion of the cylindrical flow path 15, the B resin Rb is allowed to interrupt the flow of the A resin Ra in the cylindrical form penetratingly.

Additionally, suppose that the longitudinal groove flow path 17 is formed in the overall ranges of the cylindrical flow path 15 and the reduced-diameter flow path 16. Although this ensures that the B resin Rb may interrupt the A resin Ra, the B resin comes into the direct contact with the A resin Ra with a delay and is prevented from coming into the contact until the B resin reaches the columnar joining flow path 19 that is located in the end portion of the nozzle portion 11 on the downstream thereof, resulting in negative effects such as occurrence of flow turbulence at an interface between the A resin Ra and the B resin Rb. Accordingly, the extent of the longitudinal groove flow path may be determined as appropriate in consideration of the width of the longitudinal strip-shaped portion desired to be formed and properties, such as penetrability and clarity, of the longitudinal strip-shaped portion 112 formed in the preform 101.

After passing through the reduced-diameter flow path 16, the A resin Ra and the B resin Rb in the cylindrical forms pass through the columnar joining flow path 19 to be joined into a molten resin lump in a columnar form in which the B resin is laminated in the A resin in the form of a slit. Thus obtained columnar molten resin lump is injected and filled into a cavity 2 via a pin gate 3 located in a position of the cavity 2 of the mold 1 that corresponds to the middle of the bottom portion 106 of the preform 101 (refer to FIG. 5).

Figure 8C:
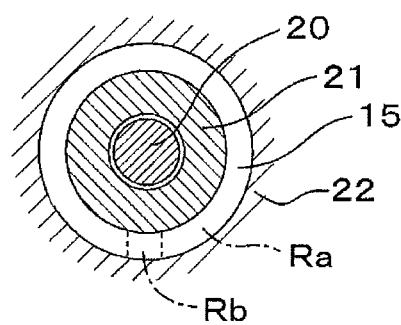
FIG. 8C is a sectional plan view taken along a line N3-N3 in FIG. 7, all of which illustrate flow path shapes.

Herein, as illustrated in the sectional plan view of FIG. 8C, in the cylindrical flow path 15 and the reduced-diameter flow path 16, the B resin Rb remains laminated in the form of a slit to interrupt the ring-shaped A resin Ra in the circumferential direction. Eventually, however, the B resin Rb is shaped into the columnar form in the joining flow path 19.

Upon the joining, the A resin and the B resin collide with each other in the vicinity of a center position of the junction flow path. At this collision time, the A resin sometimes pushes the B resin to a direction of the peripheral portion and prevents a tip of the slit-shaped B resin Rb portion from reaching the center position Cx as illustrated in FIG. 8E.

Figure 8D:
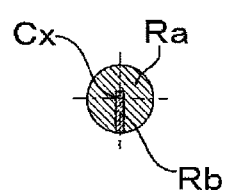
FIG. 8D is a sectional plan view of columnar resin melts taken along a line N4-N4 in FIG. 7.
Figure 8E:
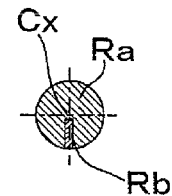
FIG. 8E is another exemplary sectional plan view of columnar resin melts.

When the molten resin lump in the laminated state as illustrated in FIG. 8E is injected and filled into the cavity 2 via the pin gate 3 of the mold 1 to inject mold the preform 1 illustrated in FIGS. 3 and 4, the A resin Ra, which is colored white, cuts into a portion of the longitudinal strip-shaped portion 112, which is made of the transparent B resin Rb, for example, a portion of the longitudinal strip-shaped portion 112 that is located on the inner circumferential surface side. Accordingly, when the preform 1 is biaxially stretch blow molded into the container 1 with a window as illustrated in FIGS. 1 and 2, various problems of defects such as a portion of the window portion 112w being colored white and a border between the window portion 212w and the adjacent white circumferential wall being unclear. As a result, usability of the container 1 as a product is ruined.

In view of the above, the injection molding apparatus illustrated in FIGS. 5A, 5B, and 7 includes the shut-off pin 20 including, in the front end portion thereof, the eccentric conical front end portion 20t, thereby reliably solving the aforementioned problems.

Figure 9:
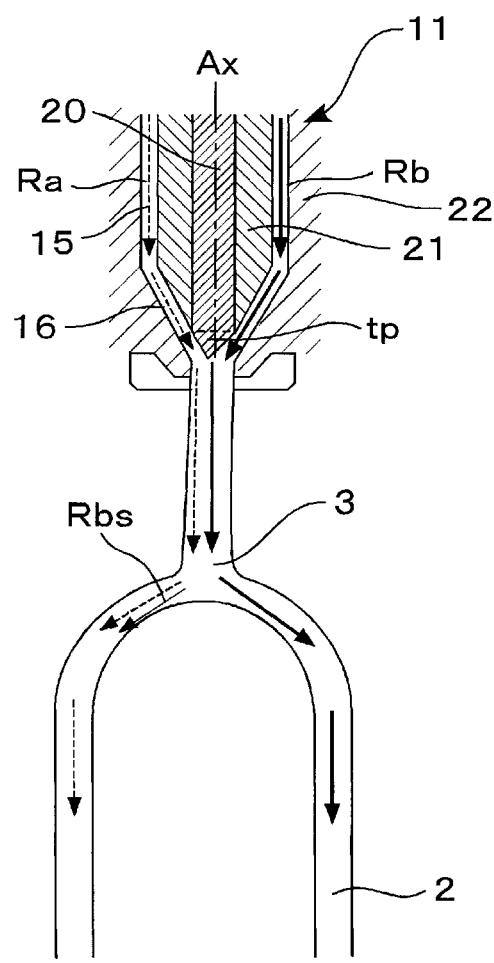
FIG. 9 is a schematic view of how resins flow in the side view of FIG. 5A.

FIG. 9 is a schematic view of how the A resin Ra and the B resin Rb flow in the side view of FIG. 5A. The eccentric conical front end portion 20t in the front end portion of the shut-off pin 20 provides an advantageous effect of enhancing flowability of the B resin Rb in the direction of the central axis Ax (in a left lateral direction in FIG. 9).

This results in the B resin Rb portion being laminated in the form of a slit extending sufficiently to reach the center position Cx, or even in the form of a slit extending beyond the center position Cx, in the flow path 19 as illustrated in the sectional view of the columnar molten resin lump in FIG. 8D.

Consequently, a portion (denoted by reference numeral Rbs in FIG. 9) of the B resin Rb flowing into the cavity 2 from the gate 3 flows around the opposite side of the circumferentially predetermined position in which the longitudinal strip-shaped portion 112 is formed.

By achieving the laminated state as illustrated in FIG. 8D and letting the portion of the B resin Rb flow around the opposite side of the circumferentially predetermined position in which the longitudinal strip-shaped portion 112 is formed, the longitudinal strip-shaped portion 112 is formed in the preform 101 in such a manner as to further ensure that the longitudinal strip-shaped portion 112 penetrates the circumferential wall. Biaxial stretch blow molding of the preform 101 provides the container with a window including the transparent and clear window portion of an even higher quality.

Thus, as illustrated in FIG. 8D, the longitudinal strip-shaped portion 112 is laminated from the peripheral edge toward the center of the bottom wall, and further to a position beyond the center position Cx of the bottom wall. Furthermore, a portion of the B resin Rb flows around the opposite side of the circumferentially predetermined position in which the longitudinal strip-shaped portion 112 is formed, resulting in the laminated structure as illustrated in FIG. 4A where the B resin Rb layer is laminated in the vicinity of a portion of the circumferential wall made of the A resin that is close to an inner circumferential surface of the circumferential wall on the opposite side of the circumferentially predetermined position in which the longitudinal strip-shaped portion 212 is formed. The preform 101 may have at least one of the above features.

Although the synthetic resin container with a window, the preform, and the injection molding apparatus of the preform according to the embodiments have been described above, this disclosure is not limited to these embodiments.

For example, although in the above embodiments the container is a round bottle made of a PET resin, any other synthetic resin such as a polypropylene resin that may be subjected to biaxial stretch blow molding may be used. Furthermore, the shape of the container may be any other shape such as a square.

Furthermore, even when a PET resin is used for each of the A resin and the B resin, a molecular weight or the like of the A resin may be differentiated from that of the B resin in consideration of flowability behavior of each resin.

By determining the molecular weight and supply temperature of each resin as appropriate, relative flowability behaviors of the A resin and the B resin may be adjusted, and fine adjustments of properties, such as the penetrability of the longitudinal strip-shaped portion and the degree of clarity of the window portion formed in the container, are accomplished.

Moreover, as the resin material of the window portion 212w, a colored transparent resin may also be used.

Moreover, in the above embodiment of the container with a window (refer to FIGS. 1 and 2), the window portion 212w is formed over the entire height range. However, the window portion 212w may also be formed over a predetermined height range of the trunk portion 205 by providing opening and closing means for the flow paths.

Moreover, in the above embodiment, the window portion 212w formed in the trunk portion 205 has a straight shape having a constant width over the entire height range. However, depending on the shape of the longitudinal groove flow path 17 and the injection pressure of the B resin, for example, the width of the window portion 212w may be increased downward in the lower end portion of the trunk portion 205.

The shape, such as the groove width, the groove depth, and the extent, of the longitudinal groove flow path 17, as well as the shape of the front end portion of the shut-off pin 20, may be determined as appropriate by checking the width of the longitudinal strip-shaped portion desired to be formed and the properties, such as the degree of clarity and uniformity of the width, of the window portion formed in the container.

FIGS. 10A to 10C are front views of three variations of the inner mandrel 21. FIG. 10A illustrates the inner mandrel 21 used in the above embodiment, and the extent of the longitudinal strip-shaped flow path 17 reaches the upper end portion of the cylindrical flow path 15. The longitudinal strip-shaped flow path 17 has a groove width W of 2 mm.

In FIG. 10B, the extent of the longitudinal strip-shaped flow path 17 is extended to the vicinity of a border between the cylindrical flow path 15 and the reduced-diameter flow path 16. The longitudinal strip-shaped flow path 17, on an upstream side thereof, has a groove width W of 4 mm and, on a downstream side thereof, a groove width W of 3 mm.

In FIG. 10C, the extent of the longitudinal strip-shaped flow path 17 is extended to a lower end of the reduced-diameter flow path 16, and the longitudinal strip-shaped flow path 17 has a groove width W of 1.5 mm.

Figure 11A:
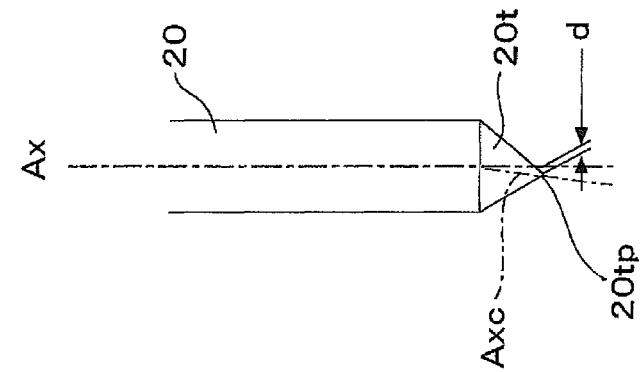
FIGS. 11A to 11C are side views of three variations in shapes of a front end portion of a shut-off pin.
Figure 11B:
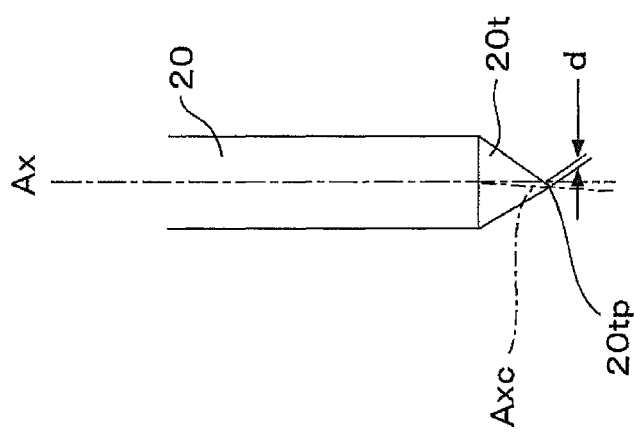
Figure 11C:
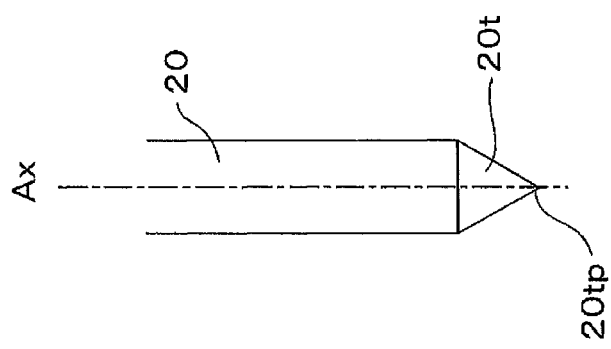

FIGS. 11A to 11C are side views of three variations in shapes of the conical front end portion 20t of the shut-off pin 20. FIG. 11A illustrates the conical front end portion 20t having no eccentricity, FIG. 11B illustrates the one having an eccentricity d of 0.2 mm, and FIG. 11C illustrates the one used in the above embodiment that has an eccentricity d of 0.4 mm.

INDUSTRIAL APPLICABILITY

The container with a window that is produced by biaxially stretch blow molding the preform molded by the injection molding apparatus according to this disclosure includes a longitudinal strip-shaped clearly transparent window portion that is conventionally considered difficult to form, and such a container is expected to be used in a wide range of applications.

The invention claimed is:

1. A synthetic resin container with a window that is produced by biaxially stretch blow molding a test-tube-shaped preform, the synthetic resin container with a window comprising a circumferential wall including a longitudinal strip-shaped portion that is made of a transparent or a semi-transparent B resin and that is formed in a longitudinal strip shape penetrating the circumferential wall in a circumferentially predetermined position in the circumferential wall over a predetermined height range, a remaining portion of the circumferential wall excluding the longitudinal strip-shaped portion being made of an A resin that is obtained by coloring a synthetic resin and that is adhesive to the B resin, and the longitudinal strip-shaped portion serving as a window portion, wherein a portion of the B resin constituting the longitudinal strip-shaped portion flows around to a side opposite to the circumferentially predetermined position in which the longitudinal strip-shaped portion is formed, to be laminated in vicinity of a portion of the circumferential wall made of the A resin that is close to an inner circumferential surface of the circumferential wall.

2. The synthetic resin container with the window of claim 1, further comprising a bottom portion, wherein the longitudinal strip-shaped portion is formed over an entire height range measured from a bottom wall of the bottom portion.

3. The synthetic resin container with the window of claim 1, wherein, in a bottom wall of a bottom portion, the longitudinal strip-shaped portion is arranged from a peripheral edge toward a center and beyond a center position of the bottom wall.

4. The synthetic resin container with the window of claim 2, wherein, in a bottom wall of a bottom portion, the longitudinal strip-shaped portion is arranged from a peripheral edge toward a center and beyond a center position of the bottom wall.

* * * * *